(12) United States Patent
Nara (10) Patent No.: US 8,820,688 B2
(45) Date of Patent: Sep. 2, 2014

(54) TILT FOOT MECHANISM OF PROJECTION DISPLAY DEVICE

(75) Inventor: Yuichiro Nara, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 2 days.

(21) Appl. No.: 13/814,230

(22) PCT Filed: Aug. 26, 2010

(86) PCT No.: PCT/JP2010/064476
§ 371 (c)(1),
(2), (4) Date: Feb. 4, 2013

(87) PCT Pub. No.: WO2012/026018
PCT Pub. Date: Mar. 1, 2012

(65) Prior Publication Data
US 2013/0140426 A1 Jun. 6, 2013

(51) Int. Cl.
*F16M 11/24* (2006.01)
*A47B 91/02* (2006.01)
*G03B 21/22* (2006.01)

(52) U.S. Cl.
CPC ............... *F16M 11/24* (2013.01); *A47B 91/02* (2013.01); *G03B 21/22* (2013.01)
USPC .................. 248/188.2; 248/188.4; 248/188.8; 353/119

(58) Field of Classification Search
USPC ........ 248/188.2, 188.4, 188.8, 157, 649, 650, 248/655, 656, 669; 353/70, 119; 411/383, 411/384, 389, 395
See application file for complete search history.

(56) References Cited

U.S. PATENT DOCUMENTS

| | | | | |
|---|---|---|---|---|
| 6,302,543 | B1* | 10/2001 | Arai et al. | 353/119 |
| 6,461,002 | B1* | 10/2002 | Su | 353/119 |
| 6,871,826 | B2* | 3/2005 | Oyama et al. | 248/188.8 |
| 7,178,768 | B2* | 2/2007 | Inoue | 248/188.4 |
| 7,198,238 | B2* | 4/2007 | Inoue | 248/188.4 |

(Continued)

FOREIGN PATENT DOCUMENTS

| JP | 2000-286563 A | 10/2000 |
|---|---|---|
| JP | 2001-356414 A | 12/2001 |

(Continued)

OTHER PUBLICATIONS

International Search Report in PCT/JP2010/064476 dated Oct. 19, 2010 (English Translation Thereof).

*Primary Examiner* — Tan Le (74) *Attorney, Agent, or Firm* — McGinn IP Law Group, PLLC (57) ABSTRACT

Provided is a tilt foot mechanism of a projection display device, in which the number of components is reduced to lower costs. The tilt foot mechanism includes foot (14) elevatable with respect to the case of the projection display device. Foot (14) includes rod (20) in which spiral groove (23) is formed. The tilt foot mechanism further includes base portion (11) integrally formed with the case, lever (12) rotatably attached to base portion (11) and having convex portion (42) formed to fit in groove (23) of rod (20), and spring (13) disposed between base portion (11) and lever (12). Lever (12) has projection (45) on which a part of foot (14) can abut. Lever (12) is rotated against the pressing of spring (13) along with the rising of foot (14) abutted on projection (45).

18 Claims, 11 Drawing Sheets

(56) References Cited

U.S. PATENT DOCUMENTS

| | | |
|---|---|---|
| 7,533,857 B2 * | 5/2009 | Chung et al. ............... 248/188.2 |
| 7,686,263 B2 * | 3/2010 | Inoue ........................ 248/188.2 |
| 2002/0139908 A1 | 10/2002 | Oyama et al. |

FOREIGN PATENT DOCUMENTS

| | | |
|---|---|---|
| JP | 2002-291554 A | 10/2002 |
| JP | 2007-147058 A | 6/2007 |
| JP | 2008-298917 A | 12/2008 |

* cited by examiner

TILT FOOT MECHANISM OF PROJECTION DISPLAY DEVICE

TECHNICAL FIELD

The present invention relates to a projection display device, and more particularly to a tilt foot mechanism.

BACKGROUND ART

There is known a projection display device having a tilt foot mechanism of adjusting a projection angle. The projection angle is an angle of the optical axis of light projected from the projection display device to a horizontal surface.

The general tilt foot mechanism has a rod-shaped foot disposed on the front side of the projection display device and a locking mechanism for adjusting the length of the foot. The foot is inserted into a case bottom surface to be movable in an axial direction. The locking mechanism is rotatably attached to the case, and engaged with the foot to fix the foot. In other words, the length of a portion of the foot projected from the case bottom surface (projection length) can be adjusted.

Accordingly, when the projection length of the foot is large, the front side of the case is high. When the projection length of the foot is small, the front side of the case is low. In other words, when the projection length of the foot is changed, the tilting (tilt angle) of the case to the horizontal surface changes, and the projection angle changes. Thus, the projection angle can be adjusted by adjusting the projection length of the foot.

Patent Literature 1 describes an example of such a tilt foot mechanism. The tilt foot mechanism described in Patent Literature 1 includes a case member, a foot member inserted into the case member, an operation lever rotatably attached to the case member, a cap member for covering the upper opening of the case member, and a coil spring disposed between the cap member and the operation lever. The operation lever is rotatable between a first position where the lever is engaged with the foot member and a second position where engagement with the foot member is released. The coil spring always presses the lever so that the operation lever can be maintained at the first position. Thus, when the operation lever at the first position is rotated against the pressing of the coil spring, the engagement between the operation lever and the foot member is released, enabling adjustment of the projection length of the foot member.

CITATION LIST

Patent Literature 1: JP2001-356414A (paragraph 0038, and FIG. 11)

SUMMARY OF INVENTION

Problems to be Solved by Invention

The tilt foot mechanism described in Patent Literature 1 needs the operation lever, the case member serving as support means for supporting the operation lever, the foot member, and the coil spring, and thus there are many components.

It is therefore an object of the invention to reduce component costs and assembling costs by reducing the number of components constituting a tilt foot mechanism as much as possible.

Solution to Problem

A tilt foot mechanism according to the present invention includes a foot elevatable with respect to the case of a projection display device. The foot includes a rod in which a spiral groove is formed. The tilt foot mechanism further includes a base portion integrally formed with the case, a lever rotatably attached to the base portion and having a convex portion formed to fit in the groove of the rod, and a spring disposed between the base portion and the lever. The lever is rotatable between a first position where the convex portion is fitted in the groove and a second position where the convex portion is separated from the groove, and always pressed toward the first position by the spring. The lever has a projection on which a part of the foot can abut. The lever is rotated toward the second position against the pressing of the spring along with the rising of the foot abutted on the projection

Effects of Invention

In the tilt foot mechanism according to the present invention, the base member for holding the lever is integrally formed with the case. Thus, the number of components constituting the tilt foot mechanism can be reduced.

DESCRIPTION OF EMBODIMENT

Figure 1:
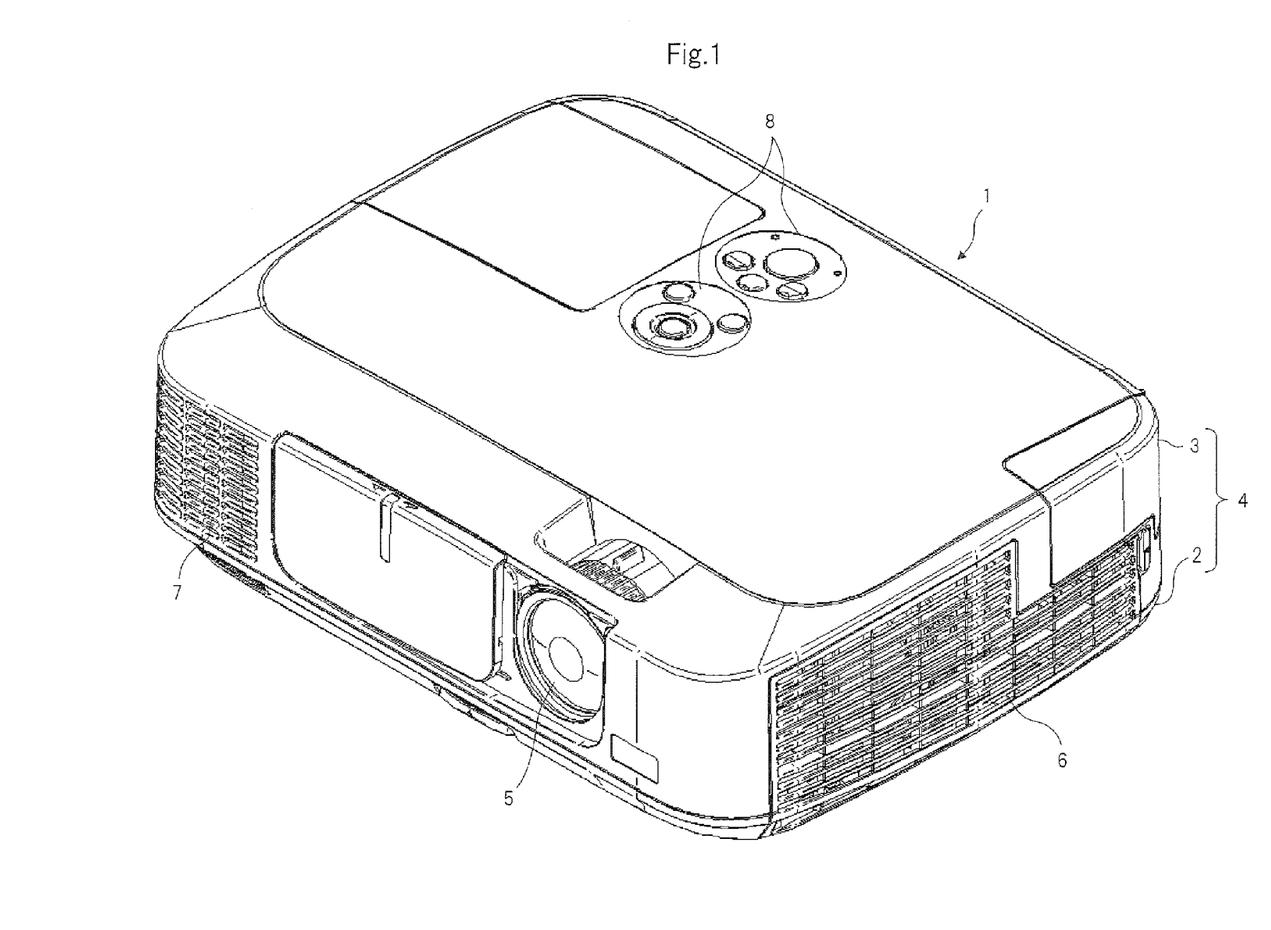
FIG. 1 is an appearance perspective view showing a projection display device having a tilt foot mechanism according to the present invention.

FIG. 1 is an appearance perspective view showing projection display device 1 having a tilt foot mechanism according to the present invention. Projection display device 1 includes case 4 having lower case 2 and upper case 3. Though not shown, case 4 houses various components such as a power unit and an optical engine. Projection lens 5 is disposed on the front face of case 4. Further, suction port 6 is formed on the side face of case 4, and an exhaust port 7 is formed on the front face of case 4. A cooling fan is disposed in the case. By the operation of this cooling fan, air is introduced from suction port 6 and discharged through exhaust port 7. On the upper surface of case 4, operation panel 8 including a plurality of operation buttons is disposed.

Figure 2:
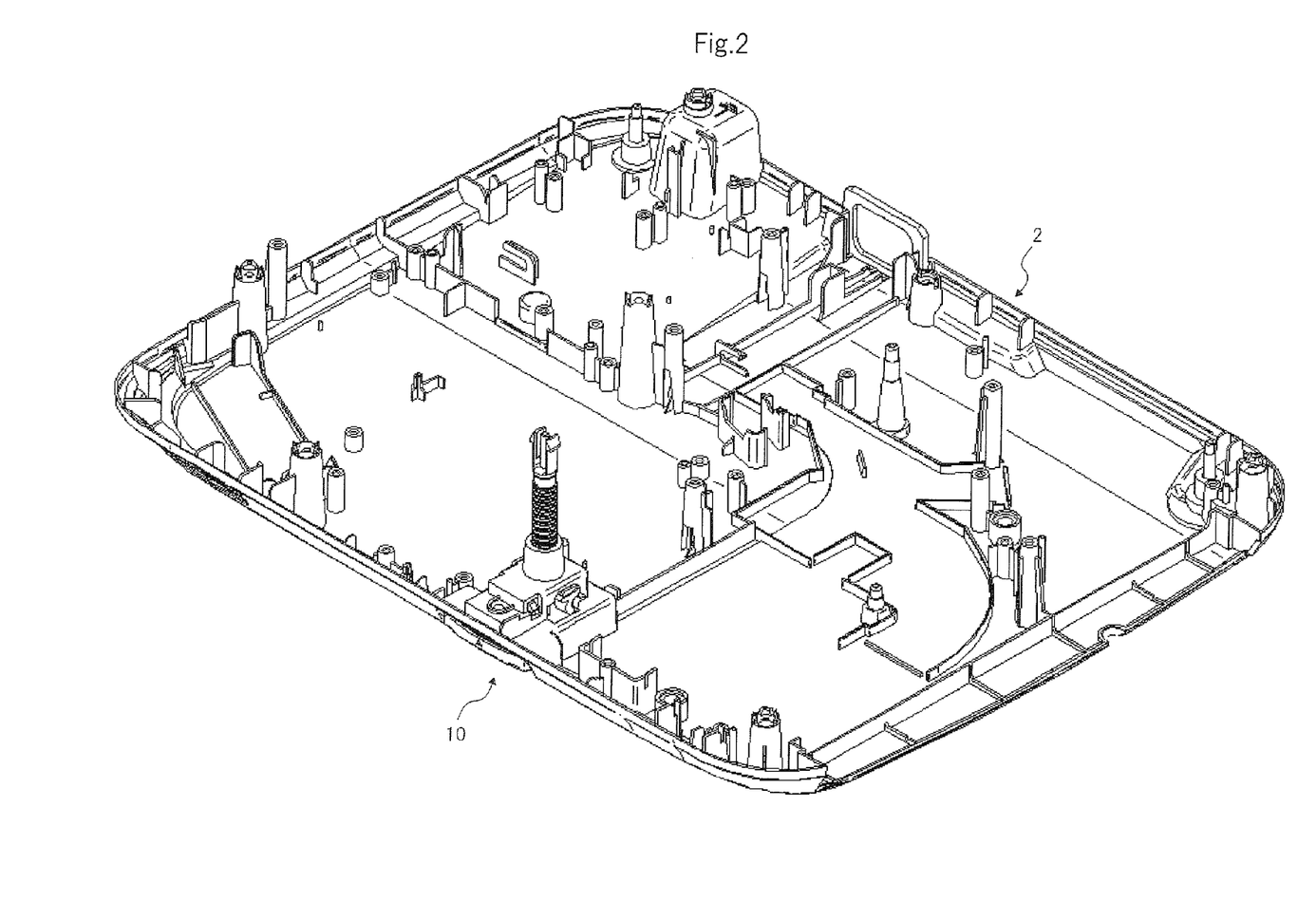
FIG. 2 is a perspective view of a lower case shown in FIG. 1.

FIG. 2 is a perspective view of lower case 2. The components including the power unit and the optical engine are arranged on shown lower case 2. However, FIG. 2 shows only tilt foot mechanism 10 while not showing the other components.

Figure 3A:
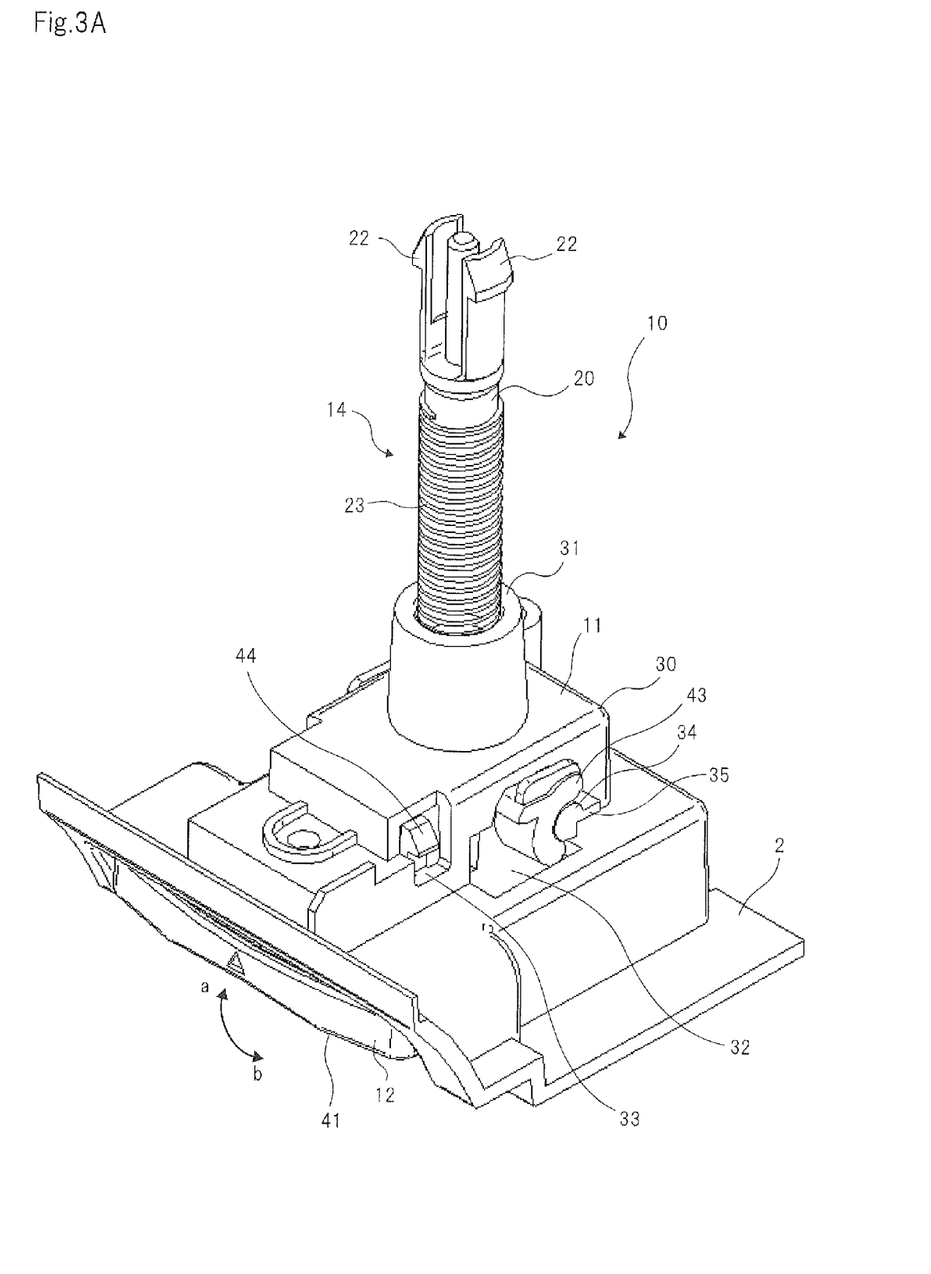
FIG. 3A is an expanded perspective view of the tilt foot mechanism.
Figure 3B:
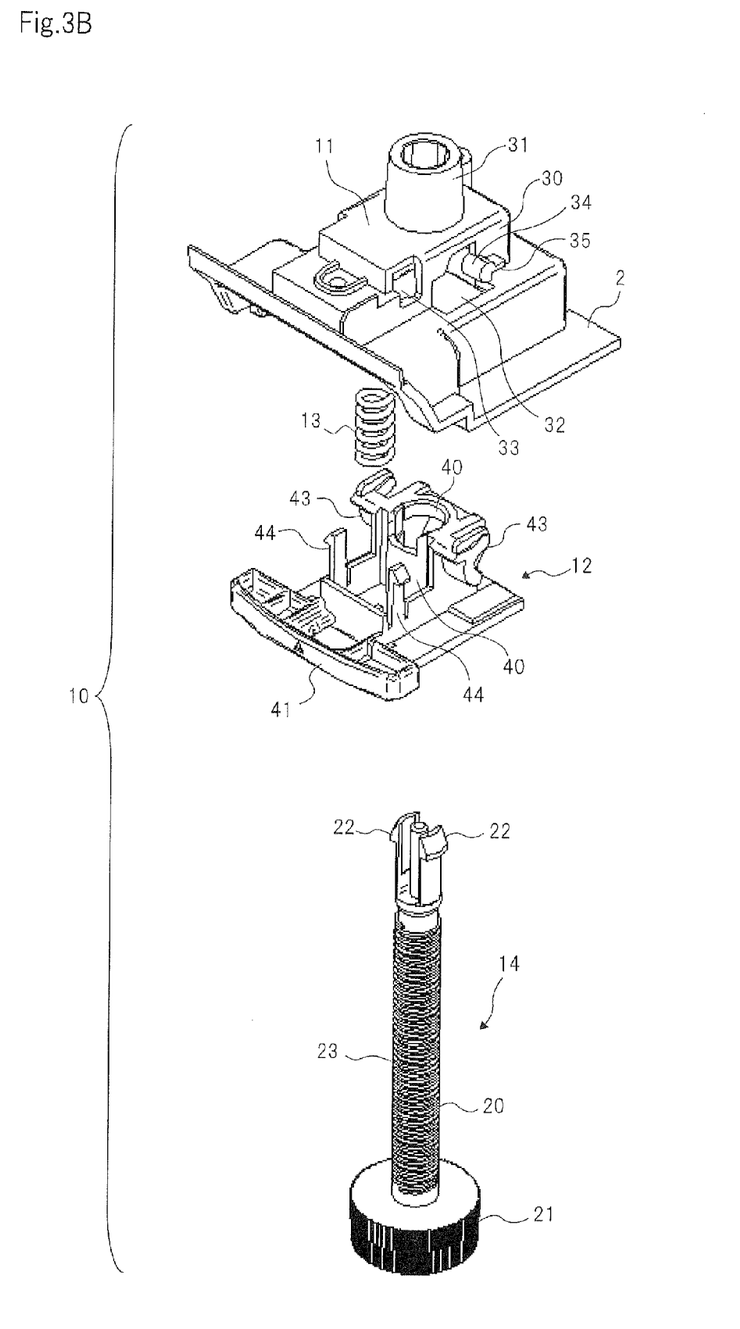
FIG. 3B is an exploded perspective view of the tilt foot mechanism.

FIG. 3A is an expanded perspective view of tilt foot mechanism 10 shown in FIG. 2, and FIG. 3B is an exploded perspective view. Tilt foot mechanism 10 is disposed on the bottom front side of case 4. Tilt foot mechanism 10 includes base portion 11 integrally formed in case 4 (lower case 2), lever 12 rotatably attached to lower case 2, coil spring 13 for pressing lever 12, and foot 14 capable of changing its projection length with respect to case 4.

Foot 14 includes rod 20, disk-shaped bottom portion 21 disposed at one end of rod 20, and retaining hook 22 disposed at the other end of rod 20. Rod 20, bottom portion 21, and retaining hook 22 are integrally formed. Spiral groove 23 is formed on the outer peripheral surface of rod 20.

Base portion 11 is integrally formed with lower case 2 to constitute a part of lower case 2. Base portion 11 is set back toward the inside of lower case 2 to form concave portion 30. In other words, base portion 11 is concaved to form a space for housing lever 12 in the bottom surface of lower case 2. Base portion 11 includes cylindrical portion 31 projected from the upper surface of concave portion 30. First opening 32 and second opening 33 are respectively formed on both side faces of concave portion 30. Shaft portion 34 is integrally formed at the edge of first opening 32. Shaft portion 34 includes stopper 35 integrally formed to extend in a direction orthogonal to the axial direction of shaft portion 34.

Lever 12 includes cylindrical portion 40 and operation unit 41 for rotating lever 12. Cylindrical portion 40 and operation unit 41 are integrally formed. Cylindrical portion 40 of base portion 11 is completely cylindrical while cylindrical portion 40 of lever 12 is not completely cylindrical. Specifically, the peripheral wall of cylindrical portion 40 is partially opened. In the inner surface (inner peripheral surface) of the peripheral wall of cylindrical portion 40, a plurality of convex portions 42 (FIG. 4B) is formed corresponding to groove 23 of foot 14. The plurality of convex portions 42 is formed at a pitch equal to that of groove 23 to be liftable in groove 23. Circular-arc bearing portions 43 are integrally formed on both sides of cylindrical portion 40. A pair of elastic pieces 44 is integrally formed between cylindrical portion 40 and operation unit 41.

Base portion 11, lever 12, coil spring 13, and foot 14 that constitute the aforementioned structure are assembled as follows.

Lever 12 is housed in concave portion 30 of base portion 11 and held to be rotatable in arrow direction a-b in FIG. 3A. Specifically, bearing portion 43 of lever 12 projects from first opening 32 of base portion 11 to receive shaft portion 34 of base portion 11. Accordingly, lever 12 can rotate in arrow direction a-b in FIG. 3A with shaft portion 34 of base portion 11 set as a rotational axis.

Elastic pieces 44 of lever 12 are respectively pressed into contact with the opposing inner surfaces of concave portion 30 to prevent backlash of lever 12. Further, the hook formed at the leading end of each elastic piece 44 projects from second opening 33 formed on the concave side face of base portion 11. The hook projected from second opening 33 is engaged with the end surface of second opening 33 to prevent falling-off of lever 12.

Figure 4A:
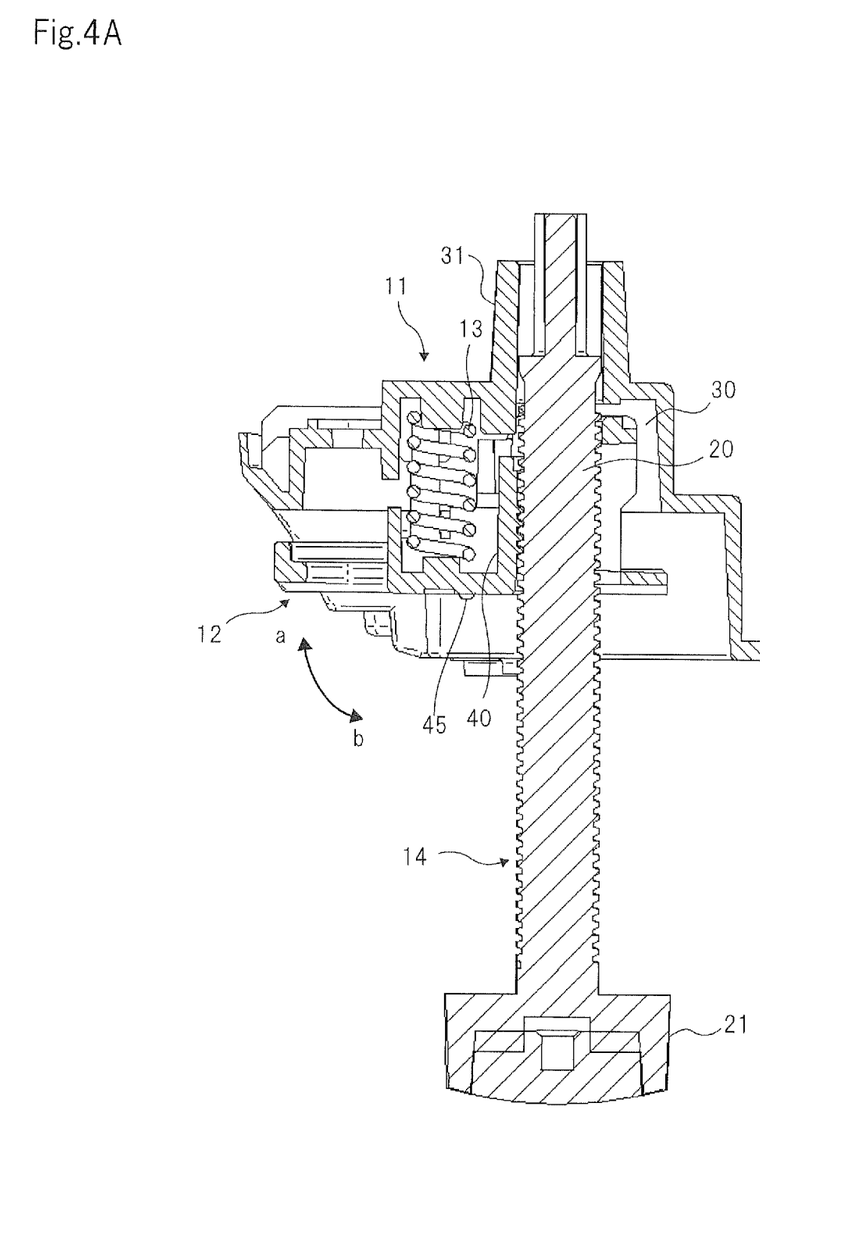
FIG. 4A is an overall sectional view of the tilt foot mechanism when a foot is fixed

After lever 12 has been received in concave portion 30 of base portion 11, as shown in FIG. 4A, cylindrical portion 40 of lever 12 is communicated with cylindrical portion 31 of base portion 11. Rod 20 of foot 14 is inserted into cylindrical portions 40 and 31 that are communicated with each other. Further, as shown in FIG. 4B, convex portion 42 formed in the inner peripheral surface of cylindrical portion 40 is fitted in groove 23 formed in the outer peripheral surface of rod 20 inserted into cylindrical portions 40 and 31.

Figure 4B:
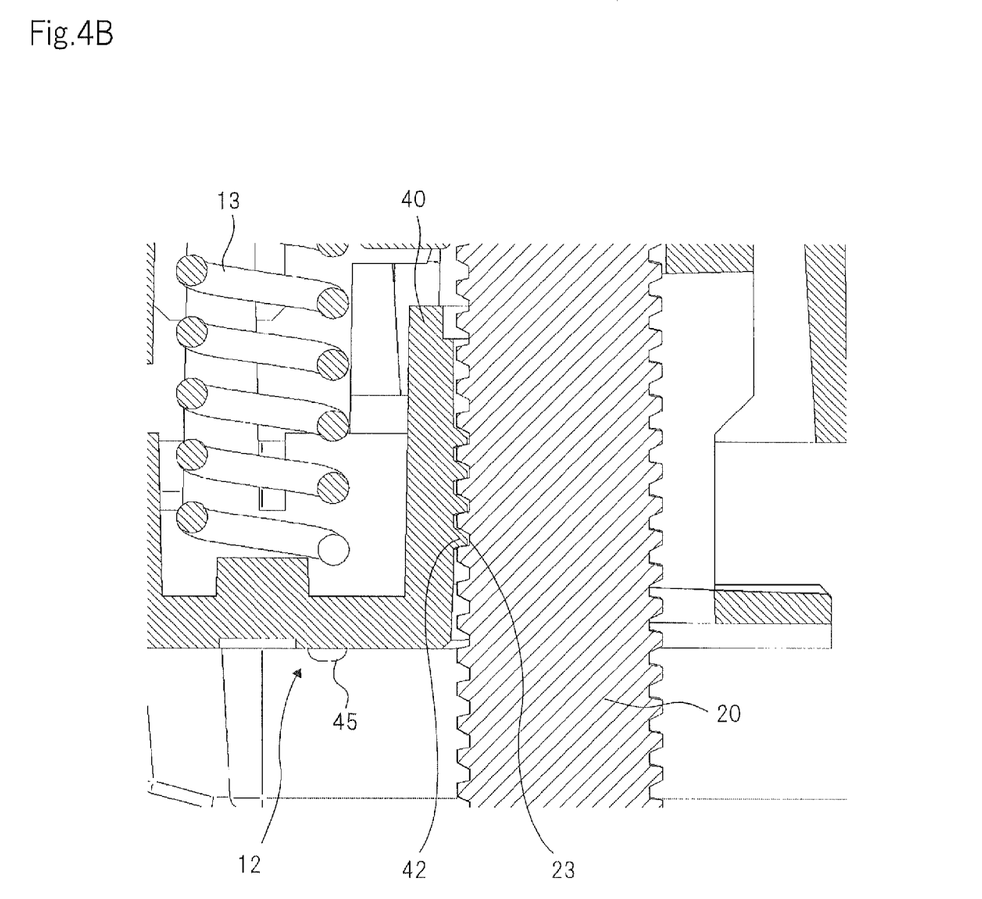
FIG. 4B is a partially expanded sectional view of the tilt foot mechanism when a foot is fixed.

As shown in FIG. 4A and FIG. 4B, coil spring 13 is disposed between lever 12 and base portion 11. More specifically, coil spring 13 is located between the concave bottom surface of base portion 11 and the inner surface of lever 12 opposite each other. Thus, lever 12 is always pressed by coil spring 13 to rotate in arrow direction b shown in FIG. 4A. This maintains engagement between groove 23 and convex portion 42, thereby fixing foot 14.

Figure 5:
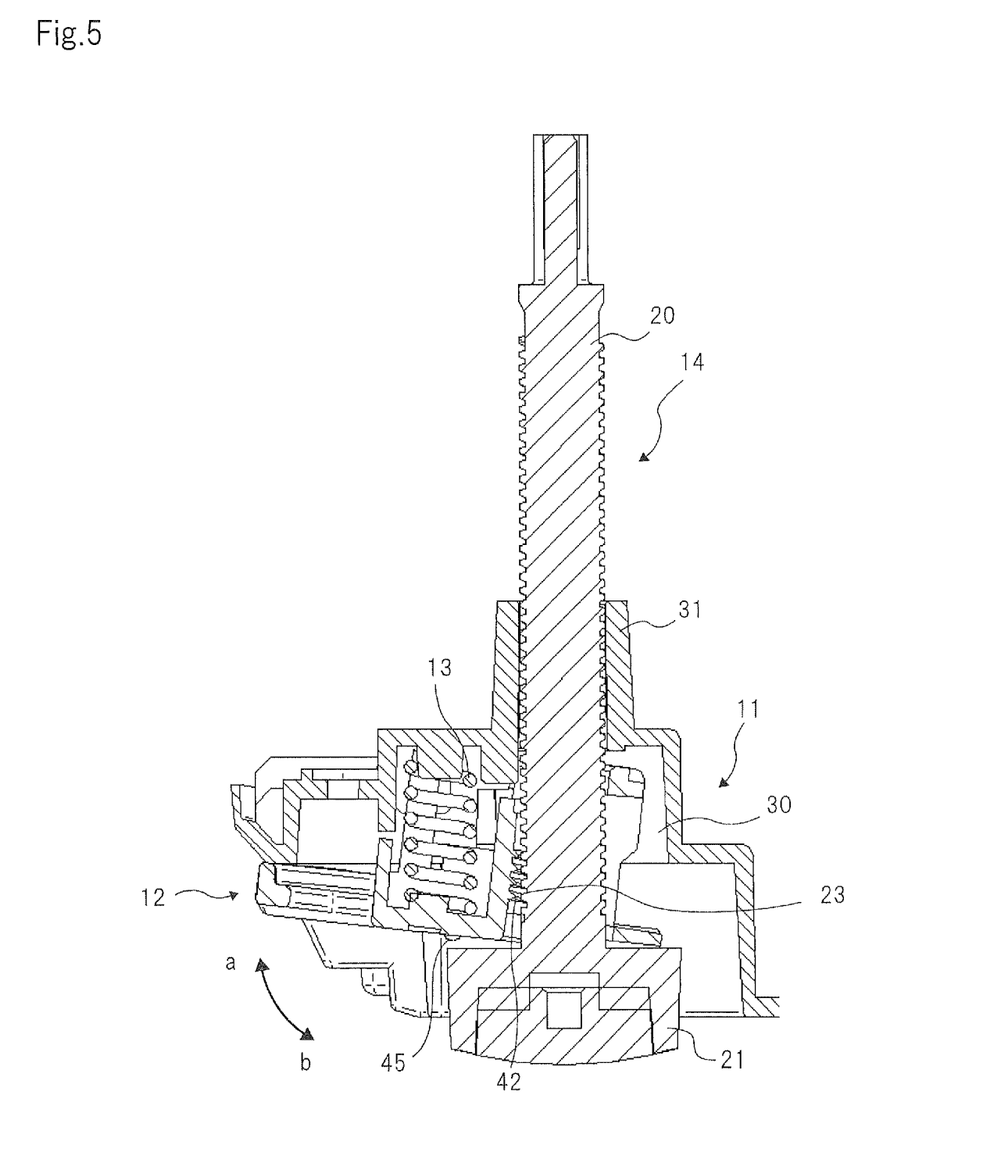
FIG. 5 is a sectional view of the tilt foot mechanism when the fixing of the foot is released.

On the other hand, as shown in FIG. 5, when lever 12 is rotated against the pressing of coil spring 13 in arrow direction a, convex portion 42 is separated from groove 23. Specifically, the fixing of foot 14 is released to be elevatable with respect to case 4. In other words, the projection length of foot 14 with respect to case 4 can be adjusted.

Thus, when the projection length of foot 14 is changed, lever 12 is rotated in arrow direction a to release the fixing of foot 14. Then, after foot 4 is raised or lowered to adjust its projection length, lever 12 is released. After lever 12 has been released, lever 12 is automatically rotated in arrow direction b by the pressing of coil spring 13. As a result, groove 23 and convex portion 42 are engaged with each other again to fix foot 14. After the fixing of foot 14 has been released, foot 14 is lowered by its self weight. However, since retaining hook 22 is formed at the leading end of rod 20, foot 14 does not fall off. Retaining hook 22 is locked in the end surface of cylindrical portion 31 of base member 11 to prevent falling-off of foot 14.

Groove 23 formed in rod 20 of foot 14 and convex portion 42 formed in cylindrical portion 40 of lever 12 are in a relationship between male and female screws. Accordingly, the projection length of foot 14 can be changed by rotating foot 14 (rod 20). Specifically, when bottom portion 21 of foot 14 is rotated clockwise, rod 20 enters into case 4 to shorten the projection length, while when bottom portion 21 of foot 14 is rotated anticlockwise, rod 20 comes out of case 4 to extend the projection length.

As described above, the projection length of foot 14 can be changed by either the first operation accompanied by the rotation of lever 12 or the second operation not accompanied by the rotation of lever 12. Generally, the projection length is roughly adjusted by the first operation, and then the projection length is fine-adjusted by the second operation.

When the projection length of foot 14 is adjusted shortest by the first operation, and then the second operation is executed to rotate the bottom portion 21 of foot 14 clockwise, convex portion 42 excessively bites in groove 23. When the projection length of foot 14 is adjusted shortest by the second operation, and then the second operation is continuously executed, convex portion 42 excessively bites in groove 23. When convex portion 42 excessively bites in groove 23, lever 12 cannot be rotated or bottom portion 21 of foot 14 cannot be rotated. In other words, the first or second operation cannot be carried out, nor can the projection length of foot 14 can be changed.

Figure 6:
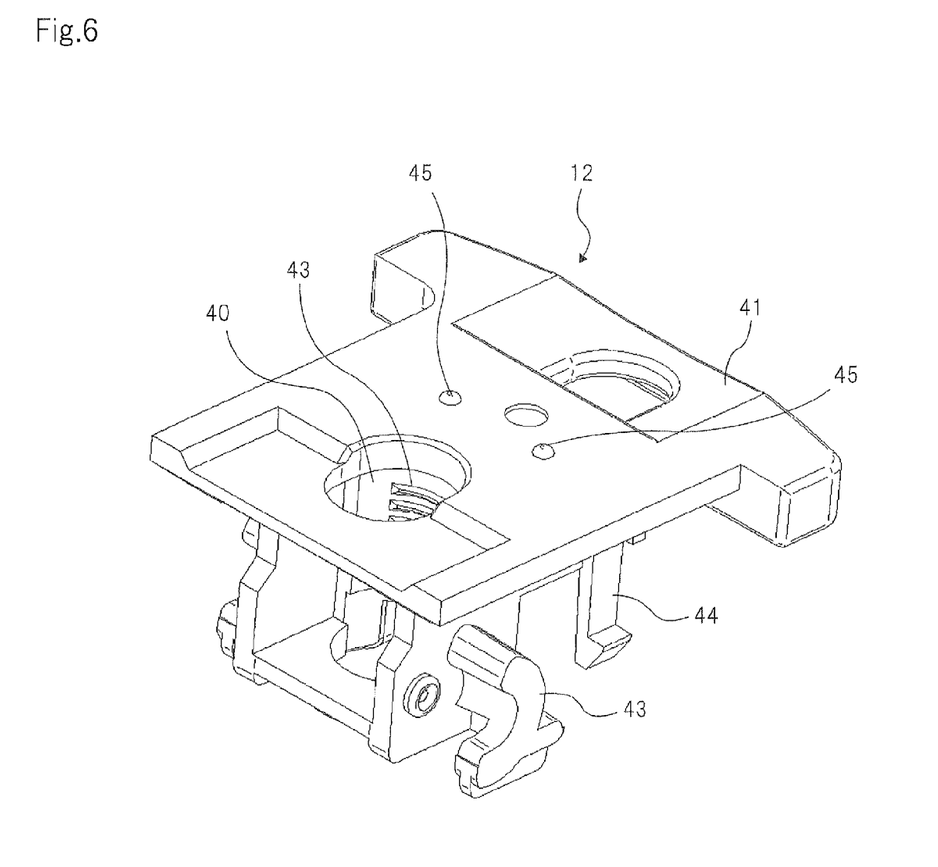
FIG. 6 is an expanded perspective view of a lever.
Figure 7:
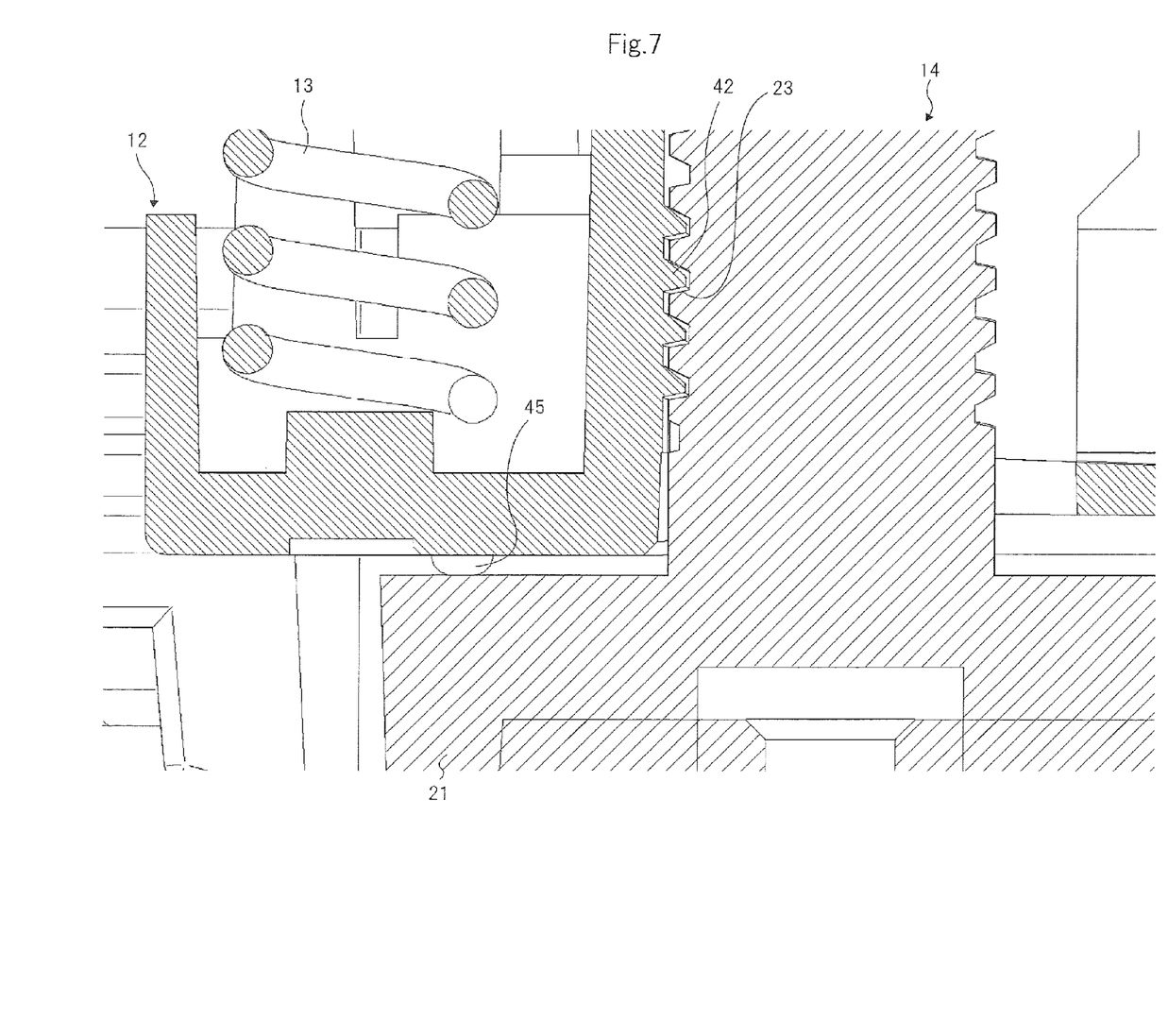
FIG. 7 is a partially expanded sectional view of the tilt foot mechanism when the projection length of the foot is shortest.

Thus, as shown in FIG. 6, two projections 45 are formed on the outer surface of lever 12 opposite the bottom upper surface of foot 14. As shown in FIG. 7, when the projection length of foot 14 is adjusted shortest by the first or second operation, the bottom upper surface of foot 14 abuts on projections 45. In other words, projections 45 are formed in the projection region of bottom portion 21 on the outer surface of lever 12.

Figure 8:
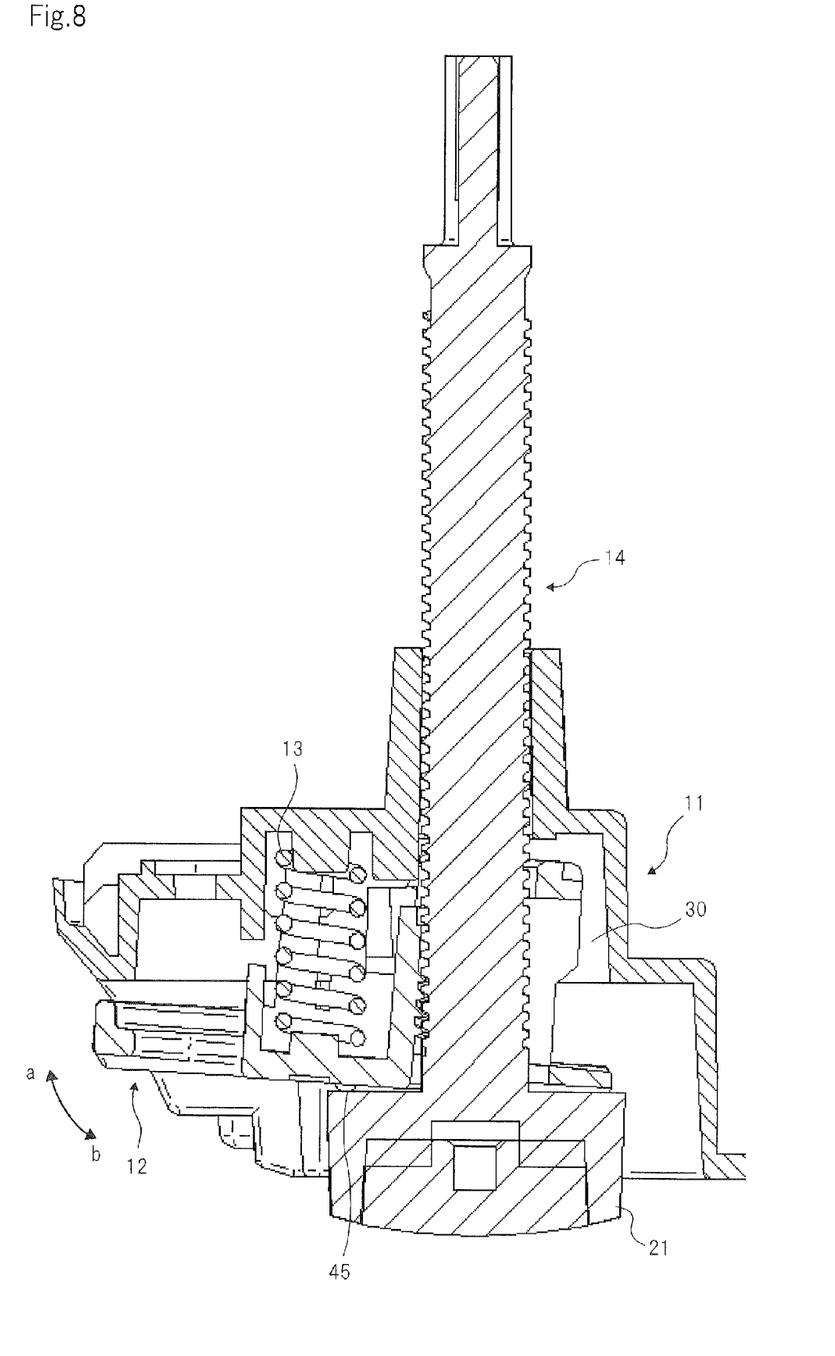
FIG. 8 is a sectional view of the tilt foot mechanism when the lever is rotated by the bottom portion of the foot.
Figure 9:
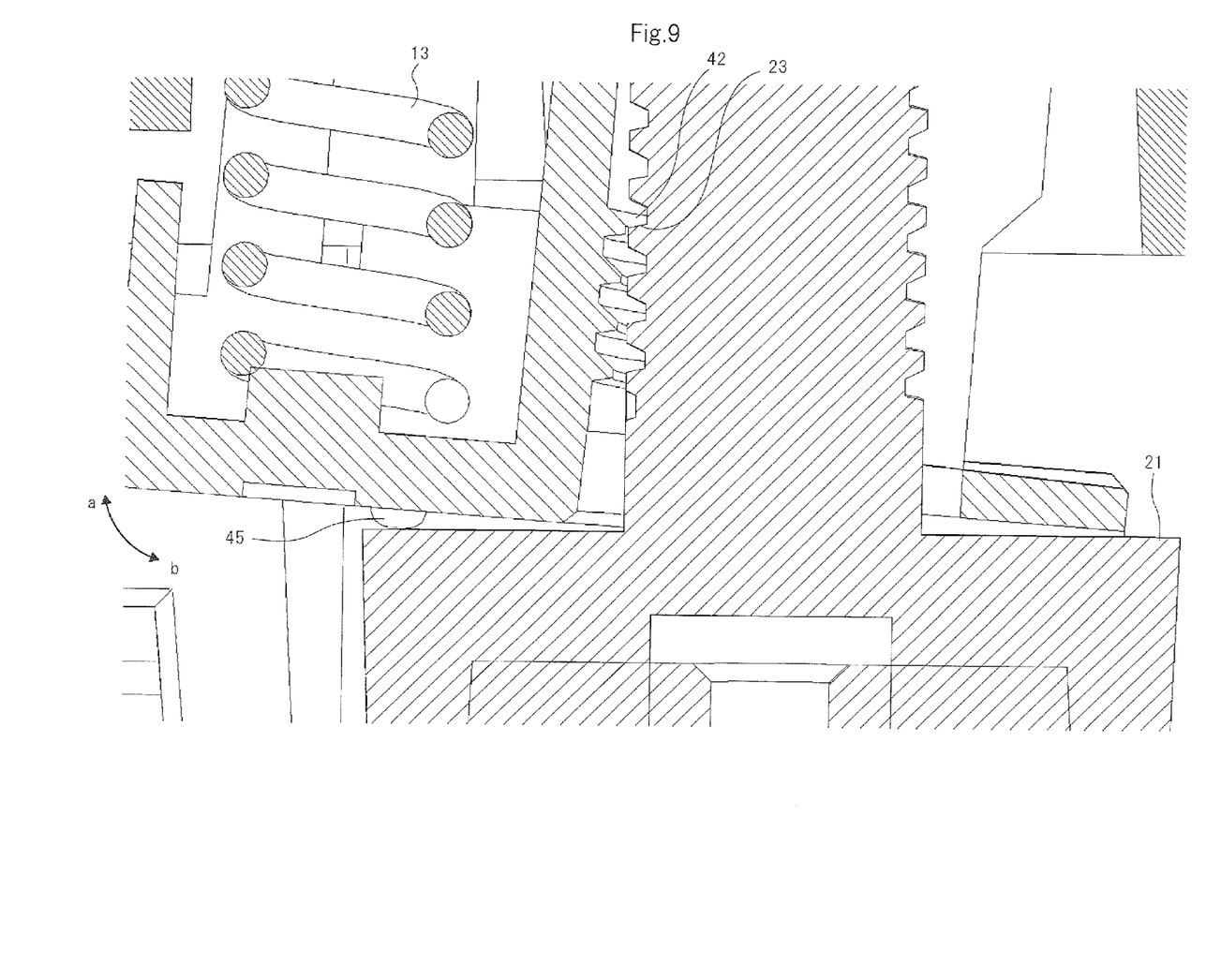
FIG. 9 is a partially expanded view of the tit foot mechanism shown in FIG. 8.

When the second operation is executed to rotate bottom portion 21 of foot 14 clockwise after the bottom upper surface of foot 14 has abutted on projections 45, as shown in FIG. 8, lever 12 is pushed up by bottom portion 21. In other words, lever 12 is rotated in arrow direction a against the pressing of coil spring 13. Accordingly, as shown in FIG. 9, convex portion 42 is slightly separated from groove 23 to prevent excessive biting. However, when convex portion 42 is completely separated from groove 23, the fixing of foot 14 is released. Thus, the height of projection 45 is set so that lever 12 can be rotated in the manner of not completely separating convex portion 42 from groove 23. Specifically, the height of projection 45 is set to 0.5 mm to 0.8 mm.

In view of the role of projection 45, it is desirable to form projection 45 at a position as close as possible to operation unit 41 of lever 12 in the projection region. The number of projections 45 is not limited to two. The number can be one, or three or more.

Projection 45 comes into contact with the bottom upper surface of foot 14. Thus, according to the embodiment, projection 45 is formed into a dome shape to reduce contact resistance. Needless to say, however, projection 45 is not limited to the dome shape.

Cylindrical portion 31 of base portion 11 and cylindrical portion 40 of lever 12 only need to have inner shapes corresponding to the shape of rod 20. In other words, the outer shapes of cylindrical portion 31 and cylindrical portion 40 do not need to be cylindrical shapes.

REFERENCE NUMERALS

1 Projection display device
2 Lower case
3 Upper case
4 Case
10 Tilt foot mechanism
11 Base portion
12 Lever
13 Coil spring
14 Foot
20 Rod
21 Bottom portion
23 Groove
31 Cylindrical portion
34 Shaft portion
40 Cylindrical portion
42 Convex portion
43 Bearing portion
44 Elastic piece
45 Projection

The invention claimed is:

1. A tilt foot mechanism having a foot that is elevatable with respect to a case of a projection display device and that includes a rod in which a spiral groove is formed, comprising:
   a base portion formed with the case;
   a lever attached to the base portion and having a convex portion; and
   a spring disposed between the base portion and the lever,
   wherein the lever is rotatable between a first position where the convex portion is fitted in the groove and a second position where the convex portion is separated from the groove, and pressed toward the first position by the spring,
   wherein the lever has a projection on which a part of the foot can abut,
   wherein the lever is rotated toward the second position against pressing of the spring along with rising of the foot abutted on the projection,
   wherein the foot includes a bottom portion having a diameter larger than a diameter of the rod and formed at a distal end of the rod,
   wherein the projection is formed on a bottom surface of the lever, and
   wherein the bottom portion of the foot is in contact with the bottom surface of the lever via the projection.

2. The tilt foot mechanism according to claim 1, wherein:
   in the base portion, a first cylindrical portion and a shaft portion are formed,
   in the lever, a second cylindrical portion that is communicated with the first cylindrical portion and a bearing portion for receiving the shaft portion are formed,
   the convex portion is formed in an inner surface of the second cylindrical portion of the lever, and
   the rod of the foot is inserted into the first cylindrical portion and the second cylindrical portion.

3. The tilt foot mechanism according to claim 2, wherein:
   a bottom portion having a diameter larger than that of the rod is formed at one end of the rod projected from the second cylindrical portion, and
   the projection is formed in a region where the bottom portion is projected on a surface of the lever.

4. The tilt foot mechanism according to claim 1, wherein in the lever, an elastic piece pressed into contact with the base portion is integrally formed.

5. The tilt foot mechanism according to claim 2, wherein in the lever, an elastic piece pressed into contact with the base portion is integrally formed.

6. The tilt foot mechanism according to claim 3, wherein in the lever, an elastic piece pressed into contact with the base portion is integrally formed.

7. A tilt foot mechanism having a foot that is elevatable with respect to a case of a projection display device and that includes a rod in which a spiral groove is formed, comprising:
   a base portion formed with the case;
   a lever attached to the base portion and having a convex portion;
   a spring disposed between the base portion and the lever, and
   a projection formed on a bottom surface of the lever,
   wherein the lever is rotatable between a first position where the convex portion is fitted in the groove and a second position where the convex portion is separated from the groove, and pressed toward the first position by the spring,
   wherein the foot includes a bottom portion having a diameter larger than a diameter of the rod and formed at a distal end of the rod, and
   wherein the bottom portion of the foot is in contact with the bottom surface of the lever via the projection.

8. A tilt foot mechanism having a foot that is elevatable with respect to a case of a projection display device and that includes a rod in which a spiral groove is formed, comprising:
   a base portion formed with the case;
   a lever attached to the base portion and having a convex portion;
   a spring disposed between the base portion and the lever; and
   a projection formed on a bottom surface of the lever,
   wherein the lever is rotatable between a first position where the convex portion is fitted in the groove and a second position where the convex portion is separated from the groove, and pressed toward the first position by the spring,
   wherein the lever is rotated toward the second position against pressing of the spring along with rising of the foot abutted on the projection, wherein the foot includes a bottom portion having a diameter larger than a diameter of the rod and formed at a distal end of the rod, wherein the bottom portion of the foot is in contact with the bottom surface of the lever via the projection wherein in the base portion, a first cylindrical portion and a shaft portion are formed, wherein in the lever, a second cylindrical portion that is communicated with the first cylindrical portion and a bearing portion for receiving the shaft portion are formed, wherein the convex portion is formed in an inner surface of the second cylindrical portion of the lever, wherein the rod of the foot is inserted into the first cylindrical portion and the second cylindrical portion, wherein a bottom portion having a diameter larger than a diameter of the rod is formed at one end of the rod projected from the second cylindrical portion, and wherein the bottom portion of the foot is in contact with the bottom surface of the lever via the projection.

9. The tilt foot mechanism according to claim 1, wherein the lever includes an operating member for rotating the lever, and wherein the projection is disposed further toward the operating member than the convex portion.

10. The tilt foot mechanism according to claim 1, wherein a height of the projection is set such that the convex portion remains in contact with the groove when the lever is rotated.

11. The tilt foot mechanism according to claim 7, wherein a height of the projection is set such that the convex portion remains in contact with the groove when the lever is rotated.

12. The tilt foot mechanism according to claim 1, wherein a height of the projection is set to 0.5 mm to 0.8 mm.

13. The tilt foot mechanism according to claim 7, wherein a height of the projection is set to 0.5 mm to 0.8 mm.

14. The tilt foot mechanism according to claim 1, wherein the lever has a plurality of projections on which the part of the foot can abut.

15. The tilt foot mechanism according to claim 1, wherein the projection protrudes from the bottom surface of the lever in a direction towards the foot.

16. The tilt foot mechanism according to claim 1, wherein the base portion is integrally formed with the case.

17. The tilt foot mechanism according to claim 1, wherein the projection abuts the bottom portion of the foot.

18. The tilt foot mechanism according to claim 1, wherein the projection comprises a dome-shaped cross-section.

* * * * *